H. C. SPECHT.
WINDING FOR DYNAMO ELECTRIC MACHINES.
APPLICATION FILED JULY 26, 1906.

931,156.

Patented Aug. 17, 1909.

WITNESSES:
Fred H. Miller
R. J. Dearborn.

INVENTOR
Hans C. Specht
BY
Hsley C. Carr
ATTORNEY

UNITED STATES PATENT OFFICE.

HANS C. SPECHT, OF WILKINSBURG, PENNSYLVANIA, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

No. 931,156.  Specification of Letters Patent.  Patented Aug. 17, 1909.

Application filed July 26, 1906. Serial No. 327,834.

*To all whom it may concern:*

Be it known that I, HANS C. SPECHT, a subject of the Emperor of Germany, and a resident of Wilkinsburg, in the county of Allegheny and State of Pennsylvania, have invented a new and useful Improvement in Windings for Dynamo-Electric Machines, of which the following is a specification.

My invention relates to windings for dynamo-electric machines, and has special reference to asynchronous motor windings.

The object of my invention is to provide windings for machines of the class above indicated that shall be simple in arrangement and that shall permit of efficient and satisfactory performance of such machines at more than one speed.

It is a well known fact that more than one operating speed of an induction motor may be obtained by varying the number of magnetic poles, but the electrical performance of such machines, as heretofore constructed, has not been satisfactory at both high and low speeds, in all cases. The speed variations have sometimes been obtained by means of several distinct primary windings which were connected to a supply circuit, but with this arrangement a considerable amount of extra material is required for the windings and the motor itself must be made large for a given capacity in order that the windings may be properly disposed.

According to my present invention, I provide a special two-circuit winding for each phase of a motor which may be connected in series for low speeds and in multiple for a speed substantially twice that obtained when the two circuits are in series. Furthermore, I provide an auxiliary winding which is adapted to assist the main winding when the smaller number of poles is produced, and which may or may not be employed according to the demands of the existing conditions.

My invention is illustrated in the accompanying drawing, in which—

Figure 1:
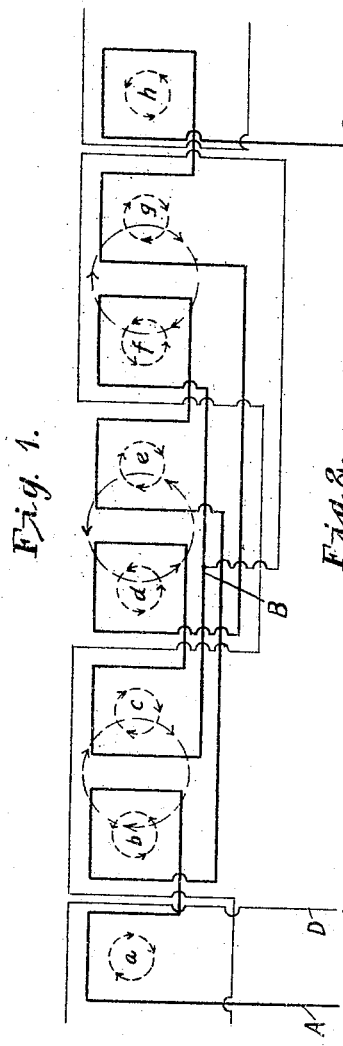
Figure 2:
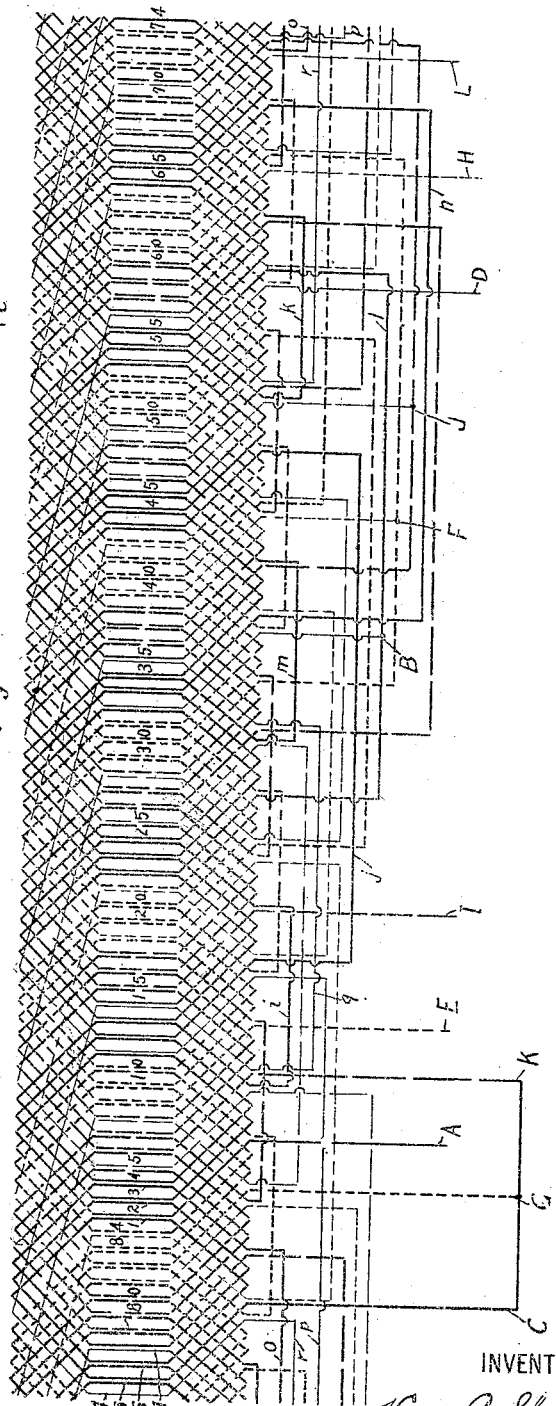

Figure 1 is a diagrammatic view of a single-phase winding arranged in accordance therewith and so drawn as to indicate the magnetic poles produced when current is supplied thereto. Fig. 2 is a diagrammatic view of a complete three-phase, two-speed winding also arranged in accordance with my invention and adapted to produce either four or eight magnetic poles, the several coils, of which the winding is comprised, being disposed in eighty-four slots.

Referring to Fig. 1, the two circuits of the main winding, when connected in series, are adapted, as shown, to produce eight magnetic poles. One of the circuits A—B produces north pole $a$, south pole $b$, north pole $e$ and south pole $f$, while the other circuit B—C is adapted to produce north pole $c$, south pole $d$, north pole $g$, and south pole $h$. When energy is supplied to terminals A—C, the two circuits being connected in series, eight alternating north and south poles are produced. If the two circuits are connected in parallel, energy being supplied to the point B, north pole $c$, south pole $d$, north pole $g$ and south pole $h$ will be produced by circuit B—C, and north pole $f$, south pole $e$, north pole $b$ and south pole $a$ will be produced by the circuit A—B, in which the direction of flow of current is now reversed. It will be noted, therefore, that, instead of having alternate north and south poles, alternate groups of two north poles and two south poles are produced, or, in other words, half as many alternate north and south poles will be produced. An auxiliary winding comprising a single circuit D—B, is adapted to produce south pole $a$—$h$, north pole $b$—$c$, south pole $d$—$e$ and north pole $f$—$g$. In this way, the main winding comprising the circuits A—B and B—C are assisted, when connected in multiple, by the auxiliary winding comprising the circuit D—B, which is connected in series with two multiple circuits.

Reference may now be had to Fig. 2, in which three complete windings, each similar to that illustrated in Fig. 1, severally form single-phase circuits for a three-phase Y-connected primary winding which, as illustrated, may be disposed in eighty-four slots. For operating the motor at a low speed, the alternating current energy from a three-phase source may be supplied to terminals A, E and I, circuits A—B and B—C, circuits E—F and F—G and circuits I—J and J—K being respectively connected in series with each other, and terminals C, G and K being interconnected to form the Y connection. A circuit is continued from terminal A, through slots 1, 11, 2, 12, 3 and 13 to produce north pole $a$; through conductor $i$ and slots 24, 14, 23, 13, 22 and 12 to produce a south pole $b$; through conductor $j$ and slots 110

43, 53, 44, 54, 45 and 55 to produce a north pole $e$; through conductor $k$ and slots 66, 56, 65, 55, 64 and 54 to produce a south pole $f$; and through conductor $l$, to terminal B, from which point, circuit is continued through the winding section B—C; through slots 22, 32, 23, 33, 24 and 34 to produce a north pole $c$; through conductor $m$ and slots 45, 35, 44, 34, 43 and 33 to produce a south pole $d$; through conductor $n$ and slots 64, 74, 65, 75, 66 and 76 to produce a north pole $g$; and through conductor $o$ and slots 3, 77, 2, 76, 1 and 75 to produce a north pole $h$ to the terminal C.

When it is desirable to operate the motor at a high speed, energy may be supplied to the terminals D, H and L, the terminals A, E and I being interconnected, whereupon the auxiliary circuits D—B, H—F and L—J are, respectively, connected in series with the following groups of parallel circuits: B—A and B—C, F—E and F—G, J—I and J—K. The circuit may be traced through the slots for the circuit D—B—A and D—B—C as follows: from terminal D through slots 53 and 77 to produce a north pole; through conductor $p$ and slots 11 and 35 to produce a north pole; through conductor $q$ and slots 14 and 74 to produce a south pole; through conductor $p$ and slots 56 and 32 to produce a south pole, from which point the circuit is continued to terminal B. From the terminal B, one circuit is completed as already described, to produce a north pole $c$, a south pole $d$, a north pole $g$ and a south pole $h$. Another circuit in parallel with this is completed from terminal B, changing the south pole $f$ to a north pole, the north pole $e$ to a south pole, the south pole $b$ to a north pole, and the north pole $a$ to a south pole. It will be observed that, as before, the multiple circuit windings and the auxiliary winding act together to form four alternate north and south poles. Windings for the circuits E—F—G and I—J—K are other phase windings corresponding to the winding A—B—C and the auxiliary winding H—F and L—J correspond to the auxiliary winding D—B and, since the disposition of these windings corresponds exactly to that of the winding hereinbefore described, I deem it unnecessary to indicate the slots in which the several coils are located.

It will be understood, by those familiar with the art, that the winding shown and described may readily be adapted for single or polyphase motors and that the number of poles, or the number of slots, may be varied to suit the conditions of operation for which the machine is designed and, consequently, I desire that only such limitations be imposed as are indicated in the appended claims.

I claim as my invention:

1. In an induction motor, a relatively slow speed winding, and an auxiliary winding adapted to produce a fraction of the number of poles produced by the slow speed winding and having one end connected to an intermediate point in the slow speed winding.

2. In an induction motor, a main winding adapted to produce a predetermined number of poles, and an auxiliary winding adapted to produce one-half as many poles as the main winding, and having one end connected to an intermediate point in the main winding.

3. In a two-speed induction motor, a main winding adapted to produce a predetermined number of poles when energy is supplied to its terminals, and an auxiliary winding adapted to produce one-half as many poles as the main winding, and having one end connected to the middle point of the main winding, whereby the latter is divided into two parallel halves which tend to produce a smaller number of poles when energy is supplied thereto.

4. A winding for induction motors comprising a series of coils arranged to produce a predetermined number of poles and, adapted when connected in multiple circuit, to produce one-half as many poles, and an auxiliary winding permanently connected to the junction of the two multiple-connected circuits and adapted to produce the lesser number of poles.

5. A main winding for induction motors comprising a plurality of coils which, when connected in series, are arranged to produce a predetermined number of poles in the following sequence: one north pole and an adjacent south pole, a third north pole and a third south pole, a second north pole and a second south pole, and a fourth north pole and a fourth south pole, and an auxiliary winding connected to the middle point of said main winding to produce one-half the number of poles produced by said main winding when its coils are connected in series.

6. An induction motor having a main winding adapted to produce two different predetermined numbers of poles, and an auxiliary winding adapted to produce the smaller number of poles and connected to an intermediate point in said main winding.

7. An induction motor having a main winding comprising a plurality of groups of coils which produce a predetermined number of poles when connected in series and adapted to produce half the said number of poles when connected in multiple, and an auxiliary winding adapted to act in conjunction with the main winding to produce the smaller number of poles.

8. A two-speed induction motor having a main winding for the slower speed, and an auxiliary winding connected to the middle point of the main winding for the higher speed.

9. A multi-speed, polyphase induction motor, each phase of which comprises a main winding for a slow speed, and an auxiliary winding which is connected to the middle point of the main winding for a higher speed.

10. A winding for dynamo-electric machines comprising, in a single circuit, a plurality of groups of coils, each of said groups producing a pair of adjacent unlike poles, and successive groups in the circuit being arranged in a different order, as to position in the winding.

11. A winding for dynamo-electric machines comprising, in a single circuit, a plurality of groups of coils, each of said group producing a pair of adjacent unlike poles, and successive groups in the circuit being separated, as to position in the winding, by other groups in the same circuit.

12. A winding for dynamo-electric machines comprising, in a single circuit, a plurality of groups of coils, each of said groups producing a pair of adjacent unlike poles, and successive groups in the circuit being divided into two sets, adjacent groups, as to position in the winding, being from different sets.

13. A winding for induction motors each phase of which comprises a plurality of coil groups, each group producing two poles, successive groups in the circuit being divided into two sets, adjacent groups, as to position in the winding, being from different sets, and, when the two sets are connected in series, each group producing unlike poles and, when the two sets are connected in multiple, each group producing like poles.

14. A winding for induction motors comprising a plurality of coils connected in series and arranged in the circuit in the following sequence of position to provide a predetermined number of alternate north and south poles: coils for one north and an adjacent south pole, coils for a third north and an adjacent south pole, coils for a second north and an adjacent south pole and coils for a fourth north and an adjacent south pole.

In testimony whereof, I have hereunto subscribed my name this 24th day of July, 1906.

HANS C. SPECHT.

Witnesses:
WILLIAM T. HENSLEY,
BIRNEY HINES.